W. B. HOSFORD.
CONVEYER.
APPLICATION FILED SEPT. 11, 1912.
1,200,497.
Patented Oct. 10, 1916.
3 SHEETS—SHEET 1.
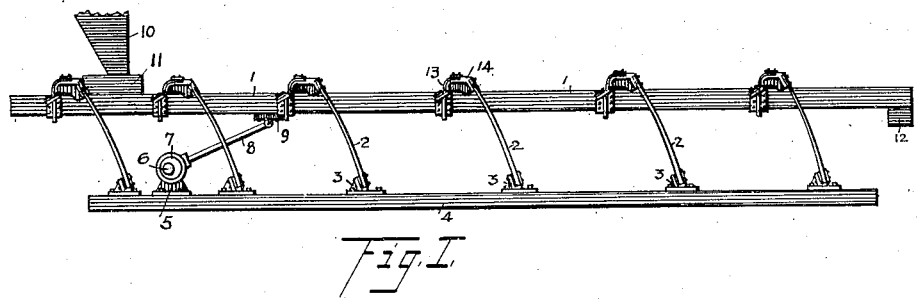
Fig. I.
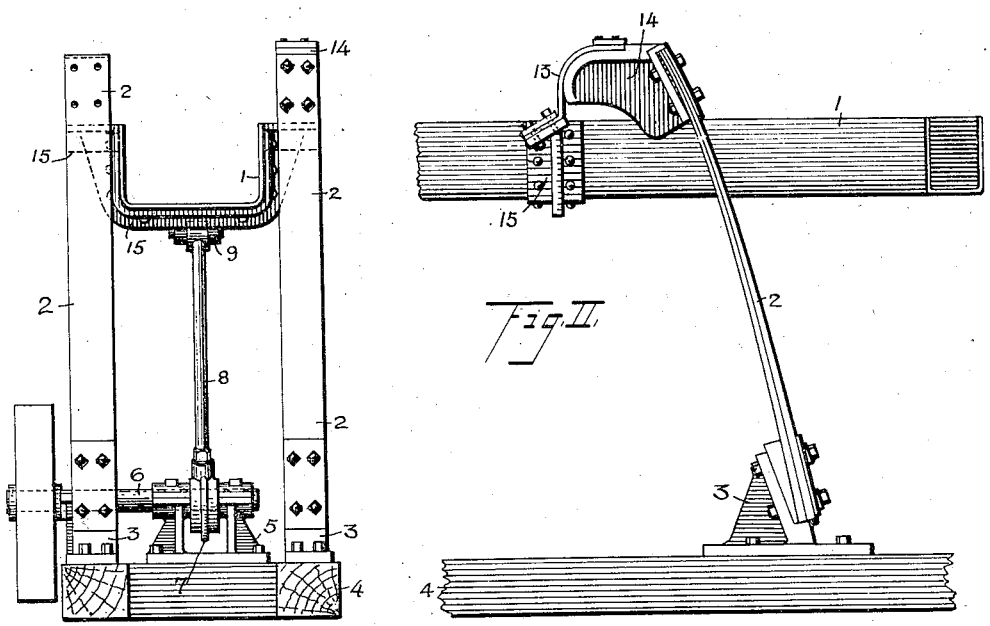
Fig. III.
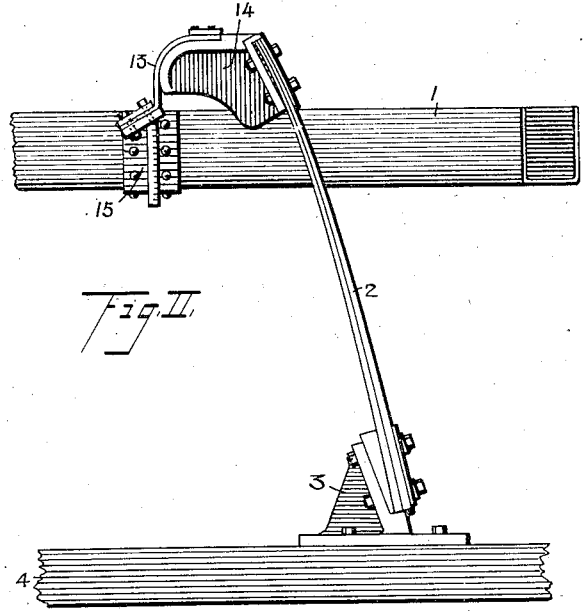
Fig. II.
Witnesses.
Adeline L. Amstutz
M. J. Saunders
William B. Hosford Inventor.
By N. S. Amstutz
Attorney W. B. HOSFORD.
CONVEYER.
APPLICATION FILED SEPT. 11, 1912.
1,200,497.
Patented Oct. 10, 1916.
3 SHEETS—SHEET 2.
Fig. IV.
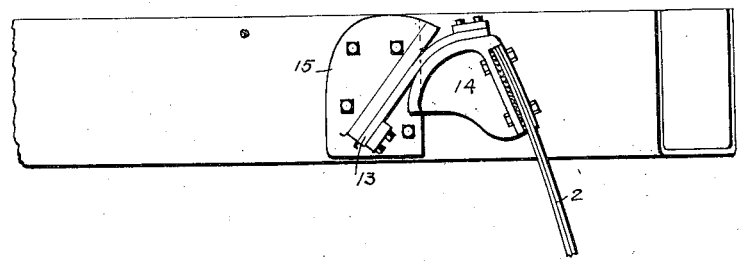
Fig. V.
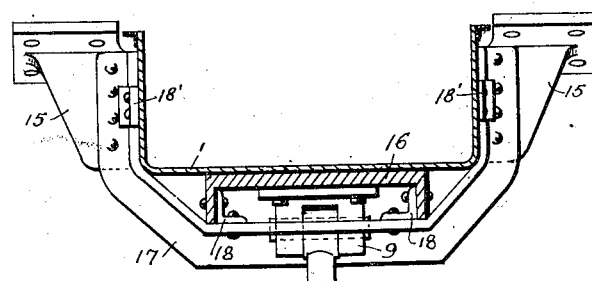
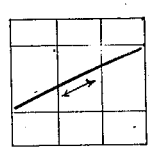
Fig. VI.
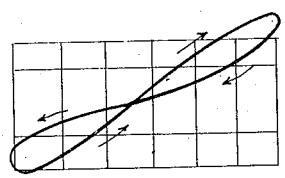
Fig. VII.
Witnesses.
Adeline L. Amstutz
M. J. Saunders
William B. Hosford Inventor
By N. S. Amstutz
Attorney

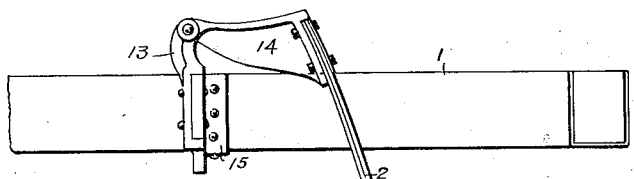
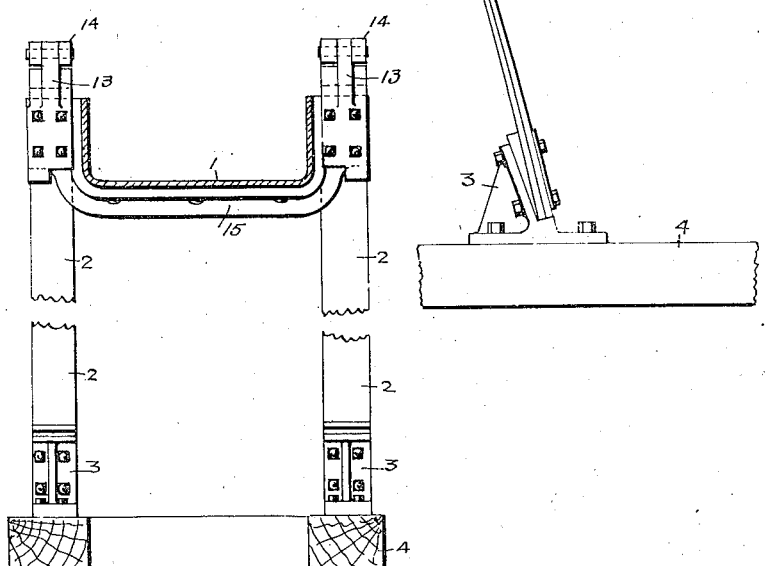

UNITED STATES PATENT OFFICE.

WILLIAM B. HOSFORD, OF MISHAWAKA, INDIANA, ASSIGNOR TO DODGE MANUFACTURING COMPANY, OF MISHAWAKA, INDIANA, A CORPORATION OF INDIANA.

CONVEYER.

1,200,497.        Specification of Letters Patent.      Patented Oct. 10, 1916.

Application filed September 11, 1912. Serial No. 719,839.

*To all whom it may concern:*

Be it known that I, WILLIAM B. HOSFORD, citizen of the United States, residing at Mishawaka, in the county of St. Joseph and State of Indiana, have invented certain new and useful Improvements in Conveyers, of which the following is a specification.

My invention relates to improvements in conveying devices and it belongs more especially to that class known as reciprocating or oscillatory conveyers, the purpose of my invention being to provide a conveyer that will work efficiently at lower vibratory speeds than conveyers of this class ordinarily do. The reciprocating type of conveyer most usually comprises a short-throw and high-speed form of drive. In the case of my improved form I reverse the order and employ a long-throw and slow-speed drive. The conveyer supports are also improved so as to give a differential throw, in which the path of travel of the forward thrust is not the same as that of the return stroke of the driving mechanism. This permits of slow acceleration at the start of the stroke, a rapid rise or lift, a retarded ending and a rapid drop with a quick return on a lower plane so as to pass backward beneath the mass of material being conveyed, and return to the beginning of the stroke for a repetition of the cycle.

A distinctive feature of my invention lies in the use of supplementary suspensions between the reciprocating end of the spring legs and the conveyer trough. It is quite immaterial as to the specific form of drive that is used and as to where and how it is attached to the conveyer.

With these ends in view I illustrate in the accompanying drawings such instances of adaptation as disclose the operative features of my invention without limiting myself to the specific details of construction shown.

Figure 1. is a side elevation, more or less diagrammatic, of a series of spring legs supporting a conveyer through supplementary suspensions, the conveyer being actuated by an ordinary form of drive. Fig. 2. is an enlarged view of a single spring leg attached to the trough by means of a supplemental suspension. Fig. 3. is a cross section of a conveyer showing a pair of spring legs. Fig. 4. is a short-coupled supplemental support, shown in side elevation. Fig. 5. is a cross section of a removable trough and its support. Fig. 6. shows a graphic curve of the movement of an ordinary type of conveyer. Fig. 7. shows a graphic curve of the differential movement of my improved form of conveyer. Fig. 8. shows, in pivoted form, a supplemental suspension. Fig. 9. is a cross section in elevation of Fig. 8.

The conveyer trough 1 is usually supported by a series of spring legs 2. The spring legs are of composite construction and they are made tapering in thickness, the reduction being toward their reciprocating ends. They are fastened to base castings 3, being grouped in pairs. The castings 3 are secured to any suitable frame 4. To this frame a bearing casting 5 may be secured, in which the main shaft 6 revolves. On this shaft an eccentric 7 (or a crank if desired) is fastened. It carries the rod 8 which is pivoted to the trough block 9. In the case of a removable trough it would be pivoted to the trough support 16.

A hopper 10, receiving box 11 and delivery end 12 are shown, but as these may be varied to suit different conditions without departing from the spirit of my invention their details of structure are not described.

The spring legs 2, at their upper ends, hold supplemental suspensions 13 which may comprise leather straps as shown in Figs. 1, 2, and 4, or an equivalent pivoted suspension as shown in Fig. 8, may be substituted. An additional substitution can be made without departing from my invention, by using an elliptical form of spring in place of the wooden spring legs 2. In such a form of spring leg one member would take the place of the composite element shown and the other member would be pivoted thereto at its upper end, similar to the suspensions mentioned. Elliptical springs as ordinarily made have the longest leaf of each half pivoted together at both ends and they are usually fastened about midway of their length. In my adaptation of this form of spring leg I make the first pivoted attachment from one end of the under member to a base casting, pivot the other end to its companion, fasten the trough about midway of this suspension or upper member and permit its lower end to have endwise movement on the base casting as the conveyer is mved to and fro.

The suspension 13 is fastened to a spring leg 2 by making a casting or other supporting feature 14 which projects lengthwise of the trough hold one end thereof, and the other end is held by a bracket 15 which projects transversely of the trough. This may be riveted to the side of the trough 1 as shown in Fig. 4, or formed as an under-trough support, as shown in Figs. 2 and 8. These supports and their spring legs are placed on each side of the trough, one group on a side. Two spring legs and two suspensions form a set that is duplicated as often as the special exigencies of the service to which the conveyer is to be put will demand.

Should the trough 1 be made detachable and in sections it would be held on an inverted channel 16, on the under side of which a cross support 17 is fastened by angles 18. The upturned ends of 17 are fastened to brackets 15 to which suspensions 13 are secured as in the case of a fixed trough. The trough sections may have ears 18' riveted to the sides thereof. These ears would be placed in pairs so as to abut the supports, 17, both "fore and aft" and thus hold the trough sections from endwise movement on the channel 16 without interfering with the free removal of the sections whenever desired.

The two Figs. 6 and 7, showing graphic curves, are drawn to the same scale. In the case of Fig. 6 the performance of an ordinary type of spring leg conveyer is disclosed. Its movement is practically on a straight inclined plane on which the forward and rearward portions of a complete reciprocation take place in practically the same path. In marked contrast to this the curve of Fig. 7 shows how the movement of my form of conveyer differentiates from that of the ordinary type. These graphic curves were made by the actual movements of the two types of conveyers, by securing to the conveyer a pencil and causing it to mark on a paper sheet that was held stationary as the conveyer moved to and fro along side thereof. In this manner all of the various features of the forward and return strokes of the conveyer are shown. This form of actual record eliminates all theorizing that is usually done in attempting to explain characteristics of complex movements that take place very rapidly and of which the unaided eye can not discriminate between one phase and another.

Among some of the practical features of my conveyer there may be pointed out that there is a reduction in the wear to which the trough sections are subjected, a longer life for the spring legs, a reduced stress on the driving mechanism and an increased efficiency of operation. High speed reciprocating conveyers, are by contrast, subjected to vibratory stresses of an augmented order. The wear on the troughs is greater because there is no differential movement of the conveying action.

If desired suitable adjustable throw-limiting devices may be employed at whatever point of the complete conveyer that may be found best adapted to the purpose.

What I claim is,

1. In conveyers, a series of projecting spring legs, a base and fastenings thereon for one end of the legs, extensions rigidly secured to their free ends, flexible suspensions fastened to such extensions, a conveyer carried by the suspensions, and means for imparting a to and fro movement to the trough which through the differential action of the legs and the suspensions causes the trough to move on different paths of travel on its in and out strokes.

2. In conveyers, composite spring legs comprising tapering members, stationary fastenings secured to the thick ends, supplementary suspension supports held at the free and thin ends thereof, a conveyer held by said supports and means for imparting movement to the mechanism.

3. In conveyers, a suitable trough, a series of projecting spring legs, suitable curved guides secured to their free ends, suspensions fastened thereto and adapted to rest on the curved portion of the guides, a suitable trough supported by the suspensions, and means for imparting reciprocatory movement to the trough whereby the to and fro movements of the trough on the suspensions will be modified by the spring legs so as to cause the to and fro movement of the trough to take place on different paths and at different speeds.

4. A vibrating conveyer, comprising a trough, tapering spring legs grouped in pairs, stationary fastenings for one end of the legs, heads attached to their free ends, suspensions from the heads to the trough adapted to have movement on the heads independently of the movement of the legs, and means for setting the trough into action.

In testimony whereof I affix my signature in presence of two witnesses.

WILLIAM B. HOSFORD.

Witnesses:
C. J. CREGIER,
GEO. B. SAWDON.